United States Patent Office 3,080,972
Patented Mar. 12, 1963

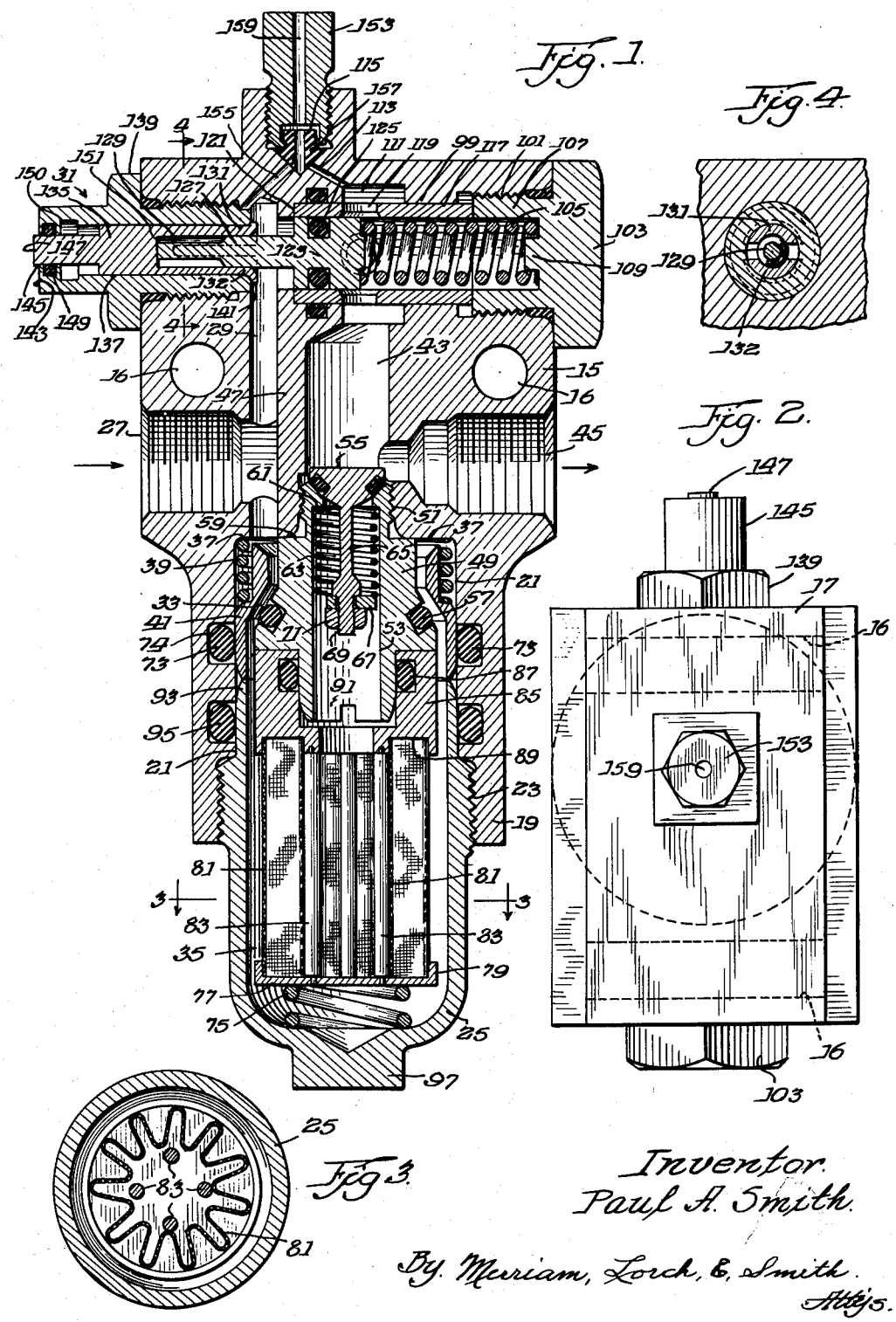

3,080,972
FILTERING COMPONENT
Paul A. Smith, Tarzana, Calif., assignor to Permanent Filter Corporation, Los Angeles, Calif., a corporation of California
Filed July 28, 1958, Ser. No. 751,351
4 Claims. (Cl. 210—90)

This invention relates to filter constructions and particularly to filters for separating minute sized contaminent particles from fluids, and to means for indicating the operating condition of the mechanism.

In fluid operated devices where functioning of controlled devices is conditioned upon the supplied fluid it becomes important to the preservation of high operating efficiency that the controlled apparatus shall be operated from fluid which is free from contaminants. In any fluid controlled apparatus contaminants have detrimental effects on the apparatus and malfunctioning often occurs soletly as a result of the lack of purity and cleanliness of the supply fluid. Where the supplied fluid is contaminated even with extremely minute and even almost microscopic size foreign matter the controlled apparatus is damaged or its operational efficiency is reduced because any contaminant tends to work against the preciseness of functioning of elements built and designed to operate with extremely high degrees of precision and minimal tolerances which often are extremely small.

Any contaminants in the fluid passing through or used for operating the controlled devices tend to causse, for instance, grooving and pitting of parts which frequently means a complete failure of the device to operate in its intended fashion. In many instances, parts included in the servo-mechanism, when not functioning at full efficiency, have the effect of causing electrical apparatus therewith associated to change its frequency response even to the point where its operation is completely unreliable. In still other instances the mere presence of even the smallest size contaminant soon introduces an erosion in the controlled apparatus to such an extent that wear on extremely expensive operated components becomes intolerable to future safe use. Generally speaking, servo-valve mechanisms, while often appearing simple in construction, are actually made with such high degrees of precision that the manufacturing costs thereof run into many hundreds of dollars so that it becomes economically important that contaminants in the operating fluids be avoided so that the controlled mechanism can be caused to operate without fault for long periods of time and, also, over this entire time period function without damage or appreciable wear.

The present invention aims to provide a filter structure wherein through the use of metallic mesh-like filter elements the filtering action may be very accurately controlled and foreign matter of even microscopic size thereby removed from fluid directed therethrough. The mechanism is so set up that incoming fluid is passed through inlet regions into the filter component, which for reasons of ease of replacement, if necessary, and particularly for cleaning following a period of use, is detachably secured to the assembly. When fluid to operate controlled devices is permitted to flow through the filter component under pressure, the minute particles are separated, and the cleaned fluid is directed out through suitable outlet chambers and connections to the controlled apparatus.

The filter components herein provided also include therewith a unique form of registering mechanism whereby indications may automatically be provided for establishing time periods when the filtering components cease to work at optimum efficiency. The mechanism is so set up that the designations of malfunctioning, when registered, are maintained until the component is re-set, but even during the period of registering a malfunctioning condition of the equipment the filter device is maintained in an operational state less than optimum (and even below a "danger point," for instance) in order that the operated devices shall not be completely deprived of any operating fluid since complete interruption is more hazardous and causes in most cases more damage than fluid supplied even at a substantially reduced pressure to the operated devices.

As the apparatus is set up and constituted the filtering components are capable of being separated from the remaining parts of the mechanism for replacement and during such periods of separation the fluid supply line is maintained free from leakage by reason of cut-off conditions being introduced between the inlet and outlet of the filter. Provisions are made for bleeding the system and restoring normal operation by restoring an atmospheric condition following a failure, and screening mechanisms are included for collecting the filtered out contaminants.

In view of the foregoing it will be appreciated that one of the primary objects of the invention is that of providing a filter structure for separating minute sized contaminants from fluid passing within the system while maintaining a flow from an inlet source to an outlet source through the filter with minimal pressure losses in the operation.

Other objects of the invention are those of providing a filter mechanism wherein provisions are made for indicating the state of operation of the filter and the degree to which contaminants in the fluid supply have been segregated.

Other objects of the invention are those of providing a filter construction which will be efficient in its operation and construction, a filter which will include a minimum number of component parts, a filter which is relatively small in size and easy to install and which is adaptable for use on various forms of fluid systems.

Other objects and advantages will become apparent from a reading of the following description and claims in conjunction with the drawings, wherein:

FIG. 1 is an elevational view in section to show the general operating components;

FIG. 2 is a plan view of the assembly of FIG. 1 with the component turned at 90° clockwise to the position in which it is shown in FIG. 1;

FIG. 3 is a sectional view on the line 3—3 through the sump with the filter element mounted therein, the view being made looking in the direction of the arrows; and FIG. 4 is a sectional view of a portion of the indicator valve assembly taken on the line 4—4 of FIG. 1 and also looking in the direction of the arrows.

Referring now to the drawings for a further understanding of the invention, the filter casing comprises an upper section 15, generally rectangular in form and having in the particular modification illustrated a rectangularly shaped top area 17, as shown particularly by FIG. 2. This upper section has mounting holes 16 therein for fastening the element rigidly in the installation with which it is used. The upper filter section is merged at its lowermost region into a bottom section 19 which is preferably of circular outer periphery which is generally hollowed out so that the outer section essentially extends (as shown) as a skirt. The lower casing as a whole provides an internal opening 21 within which a part of a valve mechanism and the lowermost sump is held. This inwardly extending opening is threaded at its lowermost portion 23 internally of the casing for the attachment thereto of a sump member 25 within which the filter components proper are assembled.

The upper section of the filter has about midway between its top and bottom an internally threaded passageway 27 leading into it from the side. Any appropriate inlet source of fluid may be connected into this passage. The filter body 15 above the opening 21 is generally of solid construction which has formed therein a second passageway 29 with which the inlet passage 27 communicates. The passageway 29 leads both upwardly to an indicating valve mechanism 31, later to be discussed in more detail, which is positioned in the upper portion of the section 15, and downwardly toward an inlet passageway 33, adapted to lead into the interior of the sump 25. Accordingly, fluid may flown from the inlet 27 through the passageway 29 and thence through the inlet passageway 33 into the interior of the sump, as represented at 35.

The internal opening 21, extending from the outer edge of the circular section 19, extends to the plane of a shoulder 37 (this extending for the full circumference of the opening) against which a spring member 39 is adapted to be positioned. The spring is to hold the position of a valve control sleeve 41 and tends to cause the passageway 33 to be closed.

Also extending inwardly from the centralmost edge of the shoulder 37, and generally centrally of the opening 21, there is a reduced diameter internal passage 43, the upper end of which provides an outlet chamber for communicating with the outlet connection 45 and also for communicating with the low pressure side of the indicator valve mechanism 31, later to be discussed. The wall 47, separating the inwardly formed internal passage 43 from the passageway 29, provides a separating barrier between the inlet and outlet. A sleeve 49 is threaded into the threaded interior wall of the internal passage 43. The sleeve 49 is elongated and provides a seat for the poppet valve 55 at its upper end by its general conically shaped inwardly extending recess leading into its internal central passage 53. The conically shaped surface of the poppet valve mechanism 55 closes the central opening in sleeve 49 when the valve is seated. When the valve is unseated fluid can flow into the internal passage 43. The outer surface of the lower part of sleeve 49 is funnel-shaped and outwardly flared so that the sleeve 41 cannot slide outwardly from its supported position in the internal opening 21. This outward flaring which starts about midway of the length of the outer periphery of the sleeve 49 also forms with the sleeve 41 the inlet passageway 33 through which fluid may be supplied from the inlet 27 to the sump 25. An O ring, designated 57, is positioned in a recess formed in the funnel-shaped outer wall of the sleeve 49 and, on conditions when the spring 39 forces the sleeve 41 downwardly, this ring provides for closing the inlet passageway 33 with substantial engagement of the sleeve and the ring.

The sleeve 49 is secured by the threads 51, formed in the interior of the upper section 15 and is tightened therein until the shoulder member 59 engages the lower edge of the wall 47 which separates the inlet and outlet passageways. The interior of the sleeve 49 is notched, as at 61, to provide a support for a valve control spring 63, which surrounds the stem 65 of the poppet valve 55. The major part of the outer turn of the free end of spring 63 rests against an adjustable sector-shaped plate 67 through which the outer threaded end 69 of the valve stem passes. The nut 71 is used to force the sector-shaped plate 67 against a shoulder at the lower end of the valve stem 65. So arranged, the force exerted by the spring 63, when it is rested against the notched shoulder 61 and exerting an outward force effective against the sector shaped plate 67, is such as to pull the valve proper downwardly by means of the sector-shaped plate 67 pressing against the nut 61 and thereby hold the valve tightly seated on the conically shaped inward recess at the upper end of the sleeve 49. This position is maintained unless some disturbing force becomes effective to unseat the valve. Pressure built up within the passageway 53 would produce such an effect, as will later be discussed.

Considering now that the assembly has been arranged as so far described it is apparent that the spring 39 forces the sleeve 41 downwardly to close the inlet passageway 33 against the O ring 57. At the same time leakage is prevented about the outside of the sleeve 41 through the spring and the inwardly recessed wall of the section 15 by means of a second O ring 73 which is fitted within a circular notch 74, as indicated. The O ring 73 is adapted to bear against the outer wall of the lower part of the sleeve 41.

Under the foregoing conditions, and ignoring for a moment any upward passageway leading from the passage 29 or 43, it will be seen that no fluid can flow from the inlet 27 to the outlet 45 (neglecting the fail-safe indicator valve 31 which will be later described in detail). However, with the attachment of the sump 25 to the internally threaded end of the circular section 19 of the casing provisions are made for opening the passage last described. The connection of the sump provides this connection as later will be explained, but prior to doing so, the general assembly of the sump proper may be considered.

The sump 25 is more or less of a cup shaped element into the lowermost portion of which a compression spring 75 is rested. The spring is adapted to bear against a retaining cap member 77 of generally disk formation, having an upwardly turned and flanged outer periphery 79. A screening section and filter section 81 is seated upon the cap 77 and located by its flanged periphery 79, as particularly shown in the sectional view of FIG. 3.

A filter of a mesh-like characteristic 81 arranged in more or less the form of a folded section is held to extend inwardly and outwardly between the inner periphery of the flange 79 on the cap 77 and a plurality of locating pins 83.

The pins 83 at their upper end locate a collar 85 having an upwardly turned shoulder of generally tubular form which is adapted to surround the outer lower section of the sleeve 49. In a notch formed on the inner wall of the tubular collar there is held an additional O ring 87 to seal, as it were, passage between the internal wall of the collar 85 and the outer surface of the sleeve 49 when the unit is assembled and the sump 25 is secured to the section 19.

The lower surface of the collar 85 is formed with a generally annularly shaped recess 89 into which the upper end of the filter screen 81 is adapted to be positioned. The outer wall of the annular recess 89 is of a diameter corresponding substantially to the inner diameter of the upturned flange 79 on the retainer cap 77. The inner wall of the annular recess 89 is of a diameter substantially corresponding to the circumferential spacing of the locating pins 83 with respect to the cap 77 and the downwardly depending portion between the central opening through the collar 85 provides a support for the locating pins. At the same time, the collar forms an entrance port into the internal passageway 91 forming a valve chamber for the poppet valve 55.

With the collar 85 located with respect to the remaining elements positioned within the sump 25, the sump may now be secured to the circular section 19 by threading it internally thereof. The upper edge wall 93 of the sump fits tightly to the internal wall of the central passage leading into the circular section 19, with the tight fit maintained by the O ring 95. Threading the sump 25 to the circular section 19 is usually achieved manually with final tightening being provided by turning the squared-off end 97 and threading the sump inwardly until the upper edge wall 93 engages the lower edge of the sleeve 41. Then, continuing the tightening movement of the sump forces the sleeve 41 to be moved upwardly so as to disengage its internal wall from the O ring 57 and, at the same time, move the sleeve element 41 upwardly against the force of the spring 39. Separation of the sleeve 41 and O ring 57 opens the passageway 33 and permits fluid entering into the passageway 27 from a high pressure source (not shown) through the passageway 29 and thence through the inlet passageway 33 and the sump interior 35 through the filter mesh 81 to the valve chamber 91.

The filter material may be of any desired character but in one of its preferred forms this may be a filter mesh formed as a screen which can be of any desired form adequate to catch and retain even extremely minute size particles. Fluid can flow through the interstitial spaces in the mesh with the size of the particles caught and held being a function of the screening element. Fluid which flows through the mesh then passes into the valve chamber 91.

It will be appreciated that the pressure available in the chamber 91 is, lacking any substantial accumulation of contaminants in the filter region 81, reduced to a very minor extent only from that available at the inlet. Accordingly, fluid pressure not greatly reduced from the inlet pressure becomes available on the underside of the generally conically shaped poppet valve 55 to raise the poppet off its seat against the force of spring 61 and permit fluid to flow through the internal passageway 43. This passageway, it will be seen, is in direct communication with an internal passageway 45 to which connection to utilization and operated apparatus (not shown) may readily be made.

Assuming now that the fluid passed from the inlet to the outlet is quite free from contaminants, flow will continue generally unimpeded. If, however, conditions arise where contaminants are picked up by the screen filter, pressure drops occur and frequently the fluid pressure available at the outlet is insufficient for the desired purposes. It is important that indications at this state of the operation should be made and to this end an indicating valve mechanism, generally designated at 31, is here provided.

The indicating valve mechanism is supported in a cylindrically shaped passageway, drilled through transversely of the top section 15 of the filter casing. This cylindrical passage is indicated in FIG. 1 as the passageway 99. It will be seen that the outermost part of this passage is threaded at 101 for a fastening nut 103 therein. The nut is positioned internally of the passageway and a valve control spring 105 adapted to rest within an upwardly extending shoulder 107 is seated therein and positioned to surround a central locating pin 109.

The cylindrical passageway 99 enlarges, as shown at 111, for communicating with the internal passageway 43 and also for communicating with a passageway 113, leading to a bleed valve 115, later to be described. Supported within the cylindrical passageway 99 is a sleeve element 117 having about its periphery a plurality of openings 119 which communicate with the enlarged passage 111 and the internal opening within the sleeve 117. The sleeve 117 is of a length such as to rest at one end on the upwardly extending shoulder 107 of the fastening nut 103, and at its other end to rest against a shoulder 121, formed internally of the cylindrical passageway 99. Also positioned internally of the sleeve 117 is a piston 123. The piston is fitted tightly to the sleeve by means of the O rings 125 which are held in recess in the piston wall. The piston has an outwardly extending rod member 127 which is round and which reduces at its outer end 129 to a considerably smaller cross-section. The shoulder formed between the rod 127 and its outer end is smoothly formed, with the drawing generally approximating an optimum form.

The piston rod, as indicated by FIG. 1, is positioned within a pair of cantilever arms 131 and 132 which, as shown by the sectional view of FIG. 4, are generally arcuate in shape and capable of being held spread apart by the positioning of the piston rod section 127 internally thereof.

The cantilever arms extend outwardly from an indicator device formed as a pin 135 having a diameter coinciding with the internal diameter of the recess 137, formed in the outer portion of the fastening nut 139 which threadedly engages the tapped opening in the upper section 15 opposite that to which fastening nut 103 attaches. The fastening nut 139, as can be seen, has its fastening threads extending inwardly thereof to engage the tapped threads.

The central passageway or recess 137 is of a size corresponding to the normal outwardly pressed position of the cantilever arms 131 and 132. The inward end of each cantilever arm, as can be seen from the drawing, is provided with a beveled shoulder 141 which extends outwardly therefrom and which overlaps the inward end of the recess 137 which communicates with the upper portion of the passageway 29. With the piston rod section 127 causing the cantilever arms 131 and 132 to spread (as shown by FIG. 1), this shoulder member of each cantilever arm overlaps this inward edge of the threaded sleeve section of the fastening nut 139. The pin 135 is positioned for sliding movement within the recess 137.

The outer end 143 of the fastening nut 139 has an opening 145 therein through which an indicator pin 147 protrudes. The opening 145 may be considered generally as providing a bearing surface through which the indicator pin passes in its slidable movement and protrusion therethrough to indicate an alarm or failure condition. Preferably there is contained within the outer portion 143 of the fastening nut 139 a recess into which the O ring 149 is fitted. Where the pin 147 is of smaller diameter than the outer end of the recess 137 and particularly where the outer end of the recess 137 is enlarged, as at the region shown at 150, it can be appreciated that where the O ring 149 is positioned, as stated, any movement of the pin 135 to the left from the position shown by the drawing is cushioned by the dash-pot effect obtained on the enlarged part of the pin moving within the chamber formed by the enlarged recess 150. This dash-pot action prevents immediate movement of the enlarged portion of the pin 135 against the inner wall of the outer end 143 of the fastening nut 139 which, particularly with high pressure in the passage 29, could cause damage to the component.

In the position in which the pin 135 and its outer end 147, forming the indicator pin, is shown it becomes evident that the filter mechanism is properly operating because the piston 123 holds the cantilever arms 131 and 132 spread. These arms at their outer ends have shoulder portions 141 which overlap the inner wall of the central recess through the internally threaded sleeve portion of the fastening nut 139 with the overlap being in the region where this opening communicates with the passageway 29.

Movement of the pin 135 is controlled by the movement of piston 123 which is joined thereto. The piston 123 is held in its indicated position when the pressure available from the inlet side of the system, acting through the passageway 29 upon the left hand side is either equal to or less than the pressure acting upon this same piston 123 from the right hand side due to the force exerted thereon by the spring 105 and the fluid pressure effective thereon due to outlet fluid pressure existing in the internal passageway 43. Should the filter screen 81 tend to clog due to its collecting by its screening action foreign material from the fluid passing from the inlet to the outlet, a pressure drop occurs so that at such time the pressure in the passages 91 and 43 is considerably less than at the inlet. Then, the spring 105 is no longer able to compensate for the pressure drop between inlet and outlet and since the outlet pressure on piston 123 added to the force exerted by the spring is insufficient to hold the piston 123 it will move to the right from the position shown.

This movement provides a passageway between the passageway 29 and the internal passage 43. When this occurs, the piston rod 127 also moves to the right. Consequently, the shoulder portion separating the larger diameter portion of the pin from the reduced diameter portion 129 is sloped, as indicated, the cantilever arms 131 and 132 are forced inwardly toward the smaller portion of the piston because the pressure within the passageway 29 then becomes effective at the outer end of each cantilever arm 131 and 132 and because of the slightly sloped or curved outer ends these elements can pass over the inner edge of the tubular recess 137 which communicates with the passageway 29. When the force effective at the outer ends of the cantilever arms 131 and 132 and at the bottom of the recess, whereat the arms are joined, is effective, the cantilever arms tend to collapse in the direction of the reduced diameter portion 129 of the piston and slide within the cylindrical region in which the pin is located so that the arms each move to the left from the position shown and with this movement the indicator pin 147 also moves to the left to protrude through the opening 145 considerably beyond that position shown with abrupt motion thereof being arrested by the dash-pot effect introduced through the location of the O ring 149.

When the cantilever arms 131 and 132 spring inwardly they prevent the piston 123 from again moving to the left, regardless of what the pressure may be because the shoulder of the cantilever tends to prevent such movement. Resetting of the combination is achieved manually by depressing the indicator pin 147 in the direction to move and spring the cantilever arms over the enlarged diameter 127 of the piston rod.

The indicator pin 147 obviously may function in any manner desired to operate an alarm system or to control any other type of mechanism, or merely to indicate by the very fact that it is moved outwardly, that the filter has become substantially saturated by contaminants. This, of itself, may be sufficient warning of the pressure drop at the outlet 45.

To bleed the system, the bleed nut 153 may be loosened from its indicated tightened position in the top section 17. With this, the pressure available in the passageway 155 communicating with the input pressure source in the passageway 29, can effectively be relieved and equalization of the pressure on each side of the piston 123 insured since passages 155 and 113 are then in communication with each other and passage 113 leads into the enlarged passage 111 which extends behind the piston 123. The bleed plug 157 is held in the internal portion of the bleed nut, and, when seated in its lowermost position (as indicated) it closes the passage into the main body of the casing. Release of the bleed nut 153 which forces the plug 157 downwardly permits the pressure effective in the passageway 155 and on the underside of the plug to lift it off its indicated seat (where it closes off passages 113 and 155) to provide a communicating passageway through the plug and passageway 159 to an external outlet. In this particular arrangement the bleed plug 157 is of very significant form due to the fact that it must stand exceedingly high pressure, as well as high temperature conditions. In one particular embodiment this plug may be in the form of a suitable plastic insert, which withstands both high pressure and temperature without deterioration. The metal of the remaining portion of the plug assembly may be generally any type desired.

When the plug 157 is released the pressure within passage 155 (substantially that in the passageway 29) at first causes the fluid to be forced out through passageway 159 in droplets but as equalization occurs there is a fine spray or fluid mist at the outlet. When this occurs the plug can be retightened and operation as desired restored.

Various modifications and changes may be made within the spirit and scope of what is herein shown and described.

Having now described the invention, what is claimed is:

1. In a filter apparatus comprising a main body having inlet and outlet ports and a partition means to isolate said ports one from the other, an outlet chamber connecting said inlet and outlet ports and a filter-containing sump connected to said main body, a fail-safe bypass connection between the inlet and outlet ports comprising a pressure indicator piston chamber having an inlet pressure portion and an outlet pressure portion, a first passageway connecting said inlet port with an inlet to said inlet pressure portion, a valve port in said piston chamber connecting said outlet port with said piston chamber and spaced from said inlet to said inlet pressure portion, a first piston separating said inlet and outlet pressure portions of the piston chamber, and an indicator piston mounted within said inlet pressure portion of said chamber for movement in response to pressure changes at said inlet port and having means operatively associated with said first piston for restraining said indicator piston in a first position during normal operation of said filter, means supporting said first piston for travel between said inlet to said inlet pressure portion and said valve port of said outlet pressure portion, and means including biasing means for normally positioning said first piston within said piston chamber to isolate said inlet to said inlet pressure portion from said valve port and to restrain said movement of said indicator piston during normal operation of said filter, whereby said first piston moves toward the outlet pressure portion of said piston chamber out of restraining engagement with said indicator piston to open said valve port into communication with said first passageway upon an abnormal imbalance in pressure between said inlet and outlet ports.

2. In a filter apparatus in accordance with claim 1 in which said indicator piston has a shank portion extending through the wall of said housing.

3. In a filter apparatus in accordance with claim 1 which includes a valve means biased in the normally closed position positioned within said outlet chamber for controlling the one-way passage to the outlet port.

4. In a filter apparatus comprising a main body having inlet and outlet ports and a partition means to isolate said ports one from the other, an outlet chamber connecting said inlet and outlet ports and a filter-containing sump connected to said main body, a fail-safe bypass connection between the inlet and outlet ports comprising a pressure indicator piston chamber having an inlet pressure portion and an outlet pressure portion, a first passageway connecting said inlet port with an inlet to said inlet pressure portion, a valve port in said piston chamber connecting said outlet port with said piston chamber and spaced from said inlet to said inlet pressure portion, a piston separating said inlet and outlet portions of said piston chamber, means supporting said piston for movement within said piston chamber between said inlet to said inlet portion and said valve port in said outlet portion, means for biasing said piston to normally isolate said inlet to said inlet portion from said valve port whereby pressure changes between said inlet and outlet portions of said piston chamber produce movement of said piston to interconnect said inlet and said valve port through said piston chamber, a pressure equalizing chamber having connections therefrom to the inlet pressure portion and outlet pressure portion of said piston chamber, and an adjustably positioned valve means contained within the pressure equalizing chamber normally to close the connections from said equalizing chamber to the inlet pressure portion and outlet pressure portion of said piston chamber.

References Cited in the file of this patent

UNITED STATES PATENTS

| | | |
|---|---|---|
| 2,418,777 | LeClair | Apr. 8, 1947 |
| 2,423,329 | LeClair | July 1, 1947 |

(Other references on following page)

UNITED STATES PATENTS

| | | |
|---|---|---|
| 2,431,782 | Walton et al. | Dec. 2, 1947 |
| 2,633,098 | Ellis | Mar. 31, 1953 |
| 2,669,707 | Ehrman | Feb. 16, 1954 |
| 2,750,047 | Hashbrouck | June 12, 1956 |
| 2,878,936 | Scavuzzo et al. | Mar. 24, 1959 |
| 2,879,892 | Frakes | Mar. 31, 1959 |
| 2,935,040 | Steensen | May 3, 1960 |
| 2,954,751 | Barnes | Oct. 4, 1960 |

FOREIGN PATENTS

| | | |
|---|---|---|
| 523,919 | Great Britain | July 25, 1940 |
| 618,523 | Great Britain | Feb. 23, 1949 |
| 774,058 | Great Britain | May 1, 1957 |